Feb. 27, 1923.

G. RÁCY 1,447,151

AUTOMOBILE ELEVATING DEVICE

Filed Apr. 14, 1922   2 sheets-sheet 1

Fig. 1.

Fig. 2.

Gábor Rácy
INVENTOR

BY Victor J. Evans
ATTORNEY

WITNESS:

Feb. 27, 1923.
G. RÁCY
1,447,151
AUTOMOBILE ELEVATING DEVICE
Filed Apr. 14, 1922  2 sheets-sheet 2
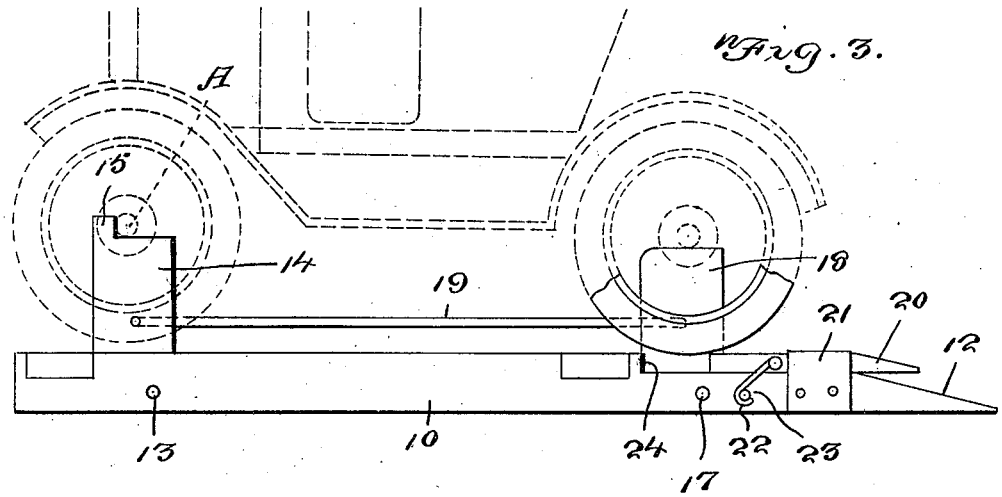
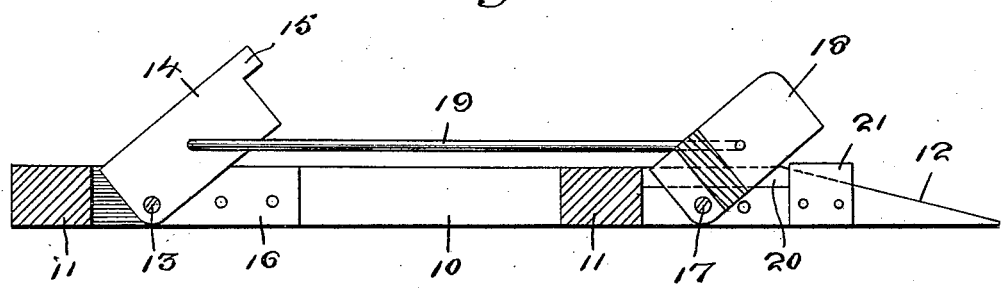
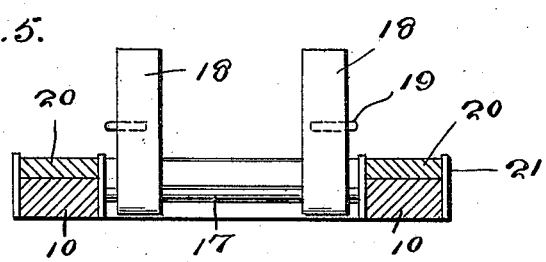
Gábor Rácy INVENTOR
BY Victor J. Evans ATTORNEY
WITNESS:

Patented Feb. 27, 1923.

1,447,151

UNITED STATES PATENT OFFICE.

GÁBOR RÁCY, OF SOUTH NORWALK, CONNECTICUT.

AUTOMOBILE ELEVATING DEVICE.

Application filed April 14, 1922. Serial No. 552,533.

*To all whom it may concern:*

Be it known that I, GÁBOR RÁCY, a citizen of the United States, residing at South Norwalk, in the county of Fairfield and State of Connecticut, have invented new and useful Improvements in Automobile Elevating Devices, of which the following is a specification.

This invention relates to jack devices and has for its object the provision of an automatic lifting or jack device onto which an automobile may be driven and which will operate to lift the front and rear axles thereof so as to raise the wheels out of engagement with the ground or floor.

An important object is the provision of a device of this character which is operated by the power of the automobile itself so that it will require no labor to effect operation.
Another object is the provision of a device of this character which is so constructed that the driving wheels, that is the rear wheels of the automobile will themselves move slidable supporting blocks mounted in the run or track way, the moving away of these blocks resulting in leaving the rear wheels clear of the ground.

An additional object is the provision of a device of this character which will be simple and inexpensive in construction, highly efficient in use, positive in action, durable in service and a general improvement in the art.

With the above and other objects and advantages in view, the invention consists in the details of construction to be hereinafter more fully described and claimed, and illustrated in the accompanying drawings, in which:
Figure 1 is a plan view of the device, Figure 2 is a side view thereof in normal position, Figure 3 is a similar view showing the device in its active position.
Figure 4 is a cross sectional view.

Figure 5 is a cross section through the centers of the rear supports.

Referring more particularly to the drawings I have shown my device as comprising a rectangular frame including longitudinal members 10 connected by cross members 11. The longitudinal members 10 constitute track ways for the wheels of the automobile to be jacked up. These longitudinal members are prolonged beyond the frame proper and have their ends inclined as shown at 12 to constitute approaches to the track ways.

Extending transversely of the frame at the end most remote from the approach members is a rod 13 upon which are pivoted supports 14 designed to be engaged by and to support the front axle A of the automobile and these members are formed with upstanding projections 15 which are engaged by the front of the axle. Secured against the inner side of one of the longitudinal members 10 is a stop block 16 for limiting rearward swinging movement of the supports 14. Extending transversely of the frame near the approach members is a rod 17 upon which are journaled upstanding supports 18 designed to engage beneath the rear axle of the automobile, and these members are connected with the supports 14 by elongated rods 19 so that simultaneous movement will occur. The supports 18 have their movement limited forwardly by their engagement with the adjacent cross member 11.

Slidably mounted upon the top of the longitudinal members 10 between the inclined approaches and the adjacent cross member 11 are plates or blocks 20 which are guided in their movement and prevented from lateral displacement by means of cleats 21 secured upon opposite sides of the members 10 as shown. Carried by these blocks or plates 20 are hooks 22 which are engageable with stops 23 on the members 10 for limiting sliding movement in one direction, the movement in the other direction being limited by shoulders 24.

Assuming that the device has been constructed and assembled as above described, the initial position is as shown in Figure 2, that is the supports 14 and 18 are in inclined position, one of the supports 14 engaging against the stop block 16. At this time the slidable plates or blocks 20 are engaged against the shoulders 24. When the automobile to be jacked up is driven over the approach members 12 on to the members 10 the front axle will engage against the projections 15 on the supports 14 and this will result in swinging the supports 14 into upright position, the front axle being elevated and the front wheels being lifted out of engagement with the members 10. At the same time, the movement of the supports 14 will be communicated to the supports 18 by virtue of the rods 19 so that the supports 18 will also swing upwardly into engagement with the underside of the rear axle of the vehicle. As the back wheels are power driven it will be apparent that they will force back the sliding blocks or plates 20 at the time that the supports 18 reach their vertical position and this will result in leaving the back wheels clear. The backward sliding movement of the slidable plates or blocks is limited by the engagement of the hooks 23 with the stops 24.

When it is desired to let down the vehicle it is first necessary that the operator kick or otherwise move the sliding plates or blocks toward their initial positions and into engagement with the tires of the rear wheels, so that when the vehicle is thrown into reverse gear the rotation of the back wheels will force the blocks or plates 21 up against the shoulders 24 whereupon the vehicle will be backed off of the members 10, the drag causing the supports 18 to tilt into inclined position, pulling with them the supports 14 so that the vehicle will be entirely free from the device.

From the foregoing description and a study of the drawings it will be apparent that I have thus provided a very simply constructed and easily controlled and operated jack device which will be a great time and labor saver and which if used continually will also be a tire saver as taking the weight off the tires while the vehicle is not in use. Owing to the simplicity of the construction and the fewness of the parts it is apparent that there is nothing to get out of order and that the device should have a long life.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A device of the character described comprising a rectangular frame including longitudinal members constituting track ways having inclined ends defining approaches, a pair of supports pivoted at one end of the frame inwardly of said longitudinal members and provided with projections engageable by the front axle of a vehicle driven onto the track ways, a second pair of supports pivoted near the other ends of the longitudinal members inwardly thereof and adapted to engage beneath the rear axle of the vehicle, rods connecting the respective ones of said pairs of supports, and said longitudinal members being formed opposite said second named supports with slidable portions adapted to be moved by the rotation of the rear wheels of the vehicle, means for guiding said slidable portions in their movement, and means for limiting said sliding movement.

2. A device of the character described comprising a rectangular frame including longitudinal members constituting track ways connected by cross members, the forward ends of said longitudinal members being inclined to define approaches, a pair or front axle engaging supports pivoted at one end of the frame, a second pair of rear axle engaging supports pivoted upon the frame near said approach members and connected with said first named supports, guides on said approach members, the longitudinal members being formed with stop shoulders adjacent the cross member nearest the approach members, and plates slidable upon said longitudinal members and normally engaging said shoulders.

In testimony whereof I affix my signature.

GÁBOR RÁCY.